(12) United States Patent
Kathirchelvan et al.

(10) Patent No.: US 11,686,256 B2
(45) Date of Patent: Jun. 27, 2023

(54) SYSTEM AND METHOD FOR SYNCHROPHASING AIRCRAFT ENGINES

(71) Applicant: BOMBARDIER INC., Dorval (CA)

(72) Inventors: Thineshan Kathirchelvan, Markham (CA); Stephen Colavincenzo, Toronto (CA); Alexis Caron-L'Ecuyer, Lachine (CA)

(73) Assignee: BOMBARDIER INC., Dorval (CA)

( * ) Notice: Subject to any disclaimer, the term of this patent is extended or adjusted under 35 U.S.C. 154(b) by 777 days.

(21) Appl. No.: 16/571,780

(22) Filed: Sep. 16, 2019

(65) Prior Publication Data
US 2021/0062726 A1 Mar. 4, 2021

Related U.S. Application Data (60) Provisional application No. 62/732,658, filed on Sep. 18, 2018.

(51) Int. Cl.
| | | |
|---|---|---|
| *B64D 31/12* | (2006.01) | |
| *F02C 9/00* | (2006.01) | |
| *G01H 17/00* | (2006.01) | |

(52) U.S. Cl.
CPC ............ *F02C 9/00* (2013.01); *B64D 31/12* (2013.01); *G01H 17/00* (2013.01); *B60W 2510/00* (2013.01); *F05D 2220/323* (2013.01); *F05D 2260/96* (2013.01); *F05D 2270/02* (2013.01)

(58) Field of Classification Search
CPC .......... F02C 9/00; B64D 31/12; G01H 17/00; B60W 2510/00; F05D 2220/323; F05D 2260/96; F05D 2270/02; F05D 2270/333; F05D 2270/334
See application file for complete search history.

(56) References Cited

U.S. PATENT DOCUMENTS

| | | | |
|---|---|---|---|
| 5,221,185 A | 6/1993 | Pla et al. | |
| 5,453,943 A | 9/1995 | Magliozzi | |
| 5,789,678 A | 8/1998 | Pla | |
| 6,896,219 B2 | 5/2005 | Borchers et al. | |
| 2005/0209814 A1* | 9/2005 | Song | G01P 3/44 |
| | | | 702/145 |
| 2018/0050809 A1 | 2/2018 | Colavincenzo et al. | |

FOREIGN PATENT DOCUMENTS

| | | | | |
|---|---|---|---|---|
| EP | 2905223 A1 | 8/2015 | | |
| GB | 2211635 A | * | 7/1989 | ............. B64C 11/50 |
| WO | 9522488 A1 | 8/1995 | | |

OTHER PUBLICATIONS

European Patent Office, Communication dated Feb. 13, 2020 re: patent application No. 19197086.2.

* cited by examiner

*Primary Examiner* — Justin Holmes
(74) *Attorney, Agent, or Firm* — Norton Rose Fulbright Canada LLP (57) ABSTRACT

Systems and method for synchrophasing aircraft engines are disclosed. One method comprises receiving data indicative of a sensed vibration level associated with a first aircraft engine and a second aircraft engine operating at a substantially same operating speed and commanding one or more momentary changes in operating speed of the second aircraft engine until the sensed vibration level substantially reaches a target vibration level. The momentary changes in operating speed of the second aircraft engine is commanded irrespective of phase information associated with imbalances of the first and second aircraft engines.

18 Claims, 10 Drawing Sheets

SYSTEM AND METHOD FOR SYNCHROPHASING AIRCRAFT ENGINES

CROSS REFERENCE TO RELATED APPLICATION AND CLAIM OF PRIORITY

This application relies for priority on U.S. Provisional Patent Application Ser. No. 62/732,658 filed on Sep. 18, 2018, the entire content of which is incorporated herein by reference.

TECHNICAL FIELD

The disclosure relates generally to aircraft, and more particularly to synchrophasing engines on multi-engine aircraft.

BACKGROUND

Engine synchrophasing on multi-engine aircraft is known and can help reduce the noise inside a passenger cabin of the aircraft. Some existing synchrophasing methods for aircraft engines involve determining a desired relative phase angle between imbalances of the aircraft engines and then trying to hold such phase angle during operation of the engines. Determining and holding a desired phase angle between aircraft engines that have relatively high rotational speeds can be challenging.

SUMMARY

In one aspect, the disclosure describes a method for synchrophasing aircraft engines. The method comprises:
receiving data indicative of a sensed vibration level associated with a first aircraft engine and a second aircraft engine operating at a substantially same operating speed; and
commanding one or more momentary changes in operating speed of the second aircraft engine until the sensed vibration level substantially reaches a target vibration level, the momentary changes in operating speed of the second aircraft engine being commanded irrespective of phase information associated with imbalances of the first and second aircraft engines.

In some embodiments, each of the one or more momentary changes in operating speed of the second aircraft engine is a respective one or more momentary increases in rotational speed of the second aircraft engine.

The sensed vibration level may comprise a summation of vibrations from the first aircraft engine and the second aircraft engine.

The target vibration level may be based on a sensed vibration level minimum associated with the first and second aircraft engines.

The method may comprise:
commanding an operating speed difference between the first and second aircraft engines to induce beats of a predefined period in resultant vibration levels associated with the first and second aircraft engines operating at different speeds; and
determining the target vibration level from the resultant vibration levels.

A magnitude of at least one of the one or more momentary changes in operating speed may be related to a magnitude of a difference between the sensed vibration level and the target vibration level.

The method may comprise commanding the one or more momentary changes in operating speed of the second aircraft engine while the first aircraft engine substantially maintains the same operating speed.

The sensed vibration level may be an acoustic noise level.

The sensed vibration level may be an acoustic noise level inside a passenger cabin of an aircraft to which the first and second aircraft engines are mounted.

The first and second aircraft engines may be turbofan gas turbine engines.

Embodiments can include combinations of the above features.

In another aspect, the disclosure describes a system for synchrophasing aircraft engines. The system comprises:
one or more sensors configured to detect a sensed vibration level associated with a first aircraft engine and a second aircraft engine operating at a substantially same operating speed; and
one or more controllers operationally coupled to receive data indicative of the sensed vibration level detected by the one or more sensors, the one or more controllers being configured to command one or more momentary changes in operating speed of the second aircraft engine until the sensed vibration level substantially reaches a target vibration level, the momentary changes in operating speed of the second aircraft engine being commanded irrespective of phase information associated with imbalances of the first and second aircraft engines.

In some embodiments, each of the one or more momentary changes in operating speed of the second aircraft engine is a respective momentary increase in rotational speed of the second aircraft engine.

The sensed vibration level may comprise a summation of vibrations from the first aircraft engine and the second aircraft engine.

The target vibration level may be based on a sensed vibration level minimum associated with the first and second aircraft engines.

The one or more controllers may be configured to determine the target vibration level based on a vibration level minimum in data indicative of a plurality of sensed vibration levels associated with the first and the second aircraft engines.

A magnitude of at least one of the one or more momentary changes in operating speed may be related to a magnitude of a difference between the sensed vibration level and the target vibration level.

The one or more controllers may be configured to command the one or more momentary changes in operating speed of the second aircraft engine while the first aircraft engine substantially maintains the same operating speed.

The one or more sensors may include one or more microphones.

Embodiments can include combinations of the above features.

In another aspect, the disclosure describes a method for synchrophasing aircraft engines. The method comprises:
receiving data indicative of a first sensed vibration level associated with a first aircraft engine and a second aircraft engine operating at a substantially same operating speed, the first sensed vibration level being higher than a target vibration level;
commanding one or more first momentary increases in operating speed of the second aircraft engine;
after the commanded one or more first momentary increases in operating speed of the second aircraft engine, receiving data indicative of a second sensed vibration level associated with the first aircraft engine and the second aircraft engine operating at substantially the same operating speed, the second sensed vibration level being higher than the target vibration level; and commanding one or more second momentary increases in operating speed of the second aircraft engine.

The first and second momentary increases in operating speed of the second aircraft engine may be commanded irrespective of phase information associated with imbalances of the first and second aircraft engines.

The target vibration level may be based on a sensed vibration level minimum associated with the first and second aircraft engines.

A magnitude of at least one of the one or more first momentary increases in operating speed may be related to a magnitude of a difference between the first sensed vibration level and the target vibration level.

A magnitude of at least one of the one or more second momentary increases in operating speed may be related to a magnitude of a difference between the second sensed vibration level and the target vibration level.

The method may comprise commanding the one or more first and second momentary changes in operating speed of the second aircraft engine while the first engine substantially maintains the same operating speed.

Embodiments can include combinations of the above features.

In another aspect, the disclosure describes a system for synchrophasing aircraft engines. The system comprises:

one or more sensors configured to sense a vibration level associated with a first aircraft engine and a second aircraft engine; and one or more controllers operationally coupled to receive signals indicative of the sensed vibration level detected by the one or more sensors, the one or more controllers being configured to:

command one or more first momentary increases in operating speed of the second aircraft engine in response to a first sensed vibration level associated with the first and second aircraft engines operating at a substantially same operating speed being higher than a target vibration level; and after commanding the one or more first momentary increases in operating speed of the second aircraft engine, command one or more second momentary increases in operating speed of the second aircraft engine in response to a second sensed vibration level associated with the first and second aircraft engines operating at the substantially same operating speed being higher than the target vibration level.

The first and second momentary increases in operating speed of the second aircraft engine may be commanded irrespective of phase information associated with imbalances of the first and second aircraft engines.

The target vibration level may be based on a sensed vibration level minimum associated with the first and second aircraft engines.

A magnitude of at least one of the one or more first momentary increases in operating speed may be related to a magnitude of a difference between the first sensed vibration level and the target vibration level.

A magnitude of at least one of the one or more second momentary increases in operating speed may be related to a magnitude of a difference between the second sensed vibration level and the target vibration level.

The one or more controllers may be configured to command the one or more first and second momentary changes in operating speed of the second aircraft engine while the first engine substantially maintains the same operating speed.

Embodiments can include combinations of the above features.

In another aspect, the disclosure describes a method for synchrophasing aircraft engines. The method comprises:

commanding a first operating speed difference between a first aircraft engine and a second aircraft engine to induce first beats of a predefined beat period in first resultant vibration levels associated with the first and second aircraft engines;

sensing the first resultant vibration levels while the first and second aircraft engines are operating at the commanded first operating speed difference;

determining a target vibration level from the sensed first resultant vibration levels;

commanding the first and second aircraft engines to operate at a substantially same operating speed;

sensing second resultant vibration levels associated with the first and second aircraft engines while the first and second aircraft engines are operating at the substantially same operating speed; and commanding one or more first momentary changes in relative operating speeds between the first and second aircraft engines so that the second resultant vibration levels substantially reach the target vibration level, the first momentary changes in relative operating speeds between the first and second aircraft engines being commanded irrespective of phase information associated with imbalances of the first and second aircraft engines.

The method may comprise sensing the first resultant vibration levels associated with the first and second aircraft engines for a duration of at least two times the predefined beat period before determining the target vibration level.

The predefined beat period may be greater than 5 seconds.

The predefined beat period may be about 10 seconds.

The target vibration level may correspond to a lowest root-mean-square (RMS) amplitude determined from the sensed first resultant vibration levels.

The sensed first resultant vibration levels may be acoustic noise levels sensed inside a passenger cabin of an aircraft to which the first and second aircraft engines are mounted.

The method may comprise:

after commanding the one or more first momentary changes in relative operating speeds, determining that the target vibration level cannot be reached;

commanding a second operating speed difference between the first and second aircraft engines to induce second beats of the predefined beat period in third resultant vibration levels associated with the first and second aircraft engines;

sensing the third resultant vibration levels while the first and second aircraft engines are operating at the commanded second operating speed difference;

determining a new target vibration level from the sensed third resultant vibration levels;

commanding the first and second aircraft engines to operate at the or other substantially same operating speed;

sensing fourth resultant vibration levels associated with the first and second aircraft engines while the first and second aircraft engines are operating at the substantially same operating speed; and commanding one or more second momentary changes in relative operating speeds between the first and second aircraft engines so that the fourth resultant vibration levels substantially reach the new target vibration level, the second momentary changes in relative operating speeds between the first and second aircraft engines being commanded irrespective of phase information associated with imbalances of the first and second aircraft engines.

Embodiments can include combinations of the above features.

In another aspect, the disclosure describes a system for synchrophasing aircraft engines. The system comprises:

one or more sensors configured to sense resultant vibration levels associated with a first aircraft engine and a second aircraft engine; and one or more controllers operationally coupled to receive signals indicative of the sensed resultant vibration levels detected by the one or more sensors, the one or more controllers being configured to:

command a first operating speed difference between the first and second aircraft engines to induce first beats of a predefined first beat period in sensed first resultant vibration levels;

using the sensed first resultant vibration levels acquired while the first and second aircraft engines are operating at the commanded first operating speed difference, determine a target vibration level;

command the first and second aircraft engines to operate at a substantially same operating speed; and using sensed second resultant vibration levels acquired while the first and second aircraft engines are operating at the substantially same operating speed, command one or more first momentary changes in relative operating speeds between the first and second aircraft engines so that the second resultant vibration levels substantially reach the target vibration level, the first momentary changes in relative operating speeds between the first and second aircraft engines being commanded irrespective of phase information associated with imbalances of the first and second aircraft engines.

The sensed first resultant vibration levels associated with the first and second aircraft engines used to determine the target vibration level may span a duration of at least two times the predefined beat period.

The predefined beat period may be greater than 5 seconds.

The predefined beat period may be about 10 seconds.

The target vibration level may correspond to a lowest root-mean-square (RMS) amplitude determined from the sensed first resultant vibration levels.

The one or more sensors may comprise an acoustic sensor disposed inside a passenger cabin of an aircraft to which the first and second aircraft engines are mounted.

The one or more controllers may be configured to:

after commanding the one or more first momentary changes in relative operating speeds, determine that the target vibration level cannot be reached;

command a second operating speed difference between the first and second aircraft engines to induce second beats of the predefined beat period in third resultant vibration levels associated with the first and second aircraft engines;

using sensed third resultant vibration levels acquired while the first and second aircraft engines are operating at the commanded second operating speed difference, determine a new target vibration level;

command the first and second aircraft engines to operate at the or other substantially same operating speed; and using fourth sensed resultant vibration levels acquired while the first and second aircraft engines are operating at the substantially same operating speed, command one or more second momentary changes in relative operating speeds between the first and second aircraft engines so that the fourth resultant vibration levels substantially reach the new target vibration level, the second momentary changes in relative operating speeds between the first and second aircraft engines being commanded irrespective of phase information associated with imbalances of the first and second aircraft engines.

Embodiments can include combinations of the above features.

In another aspect, the disclosure describes an aircraft comprising the system as described herein.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

Various aspects of the present disclosure can be useful for synchrophasing two or more engines on multi-engine aircraft. The systems and methods disclosed herein can be used to reduce a resultant vibration (e.g., structural vibration, noise) caused by the aircraft engines. Such reduction in vibration can result in improved passenger comfort in aircraft. In some embodiments, the systems and methods disclosed herein can be useful for synchrophasing aircraft engines without the need for phase information associated with imbalances of the aircraft engines. For example, for the systems and methods disclosed herein, there is no need for determining and trying to hold a desired phase angle between two aircraft engines so the systems and methods disclosed herein can also be used for synchrophasing aircraft engines that have relatively high rotational speeds (e.g., turbofan gas turbine engines). In some embodiments, the systems and methods disclosed herein can make use of a sensed vibration level associated with two (or more) aircraft engines and command one or more momentary (i.e., brief, short-lived, temporary, transitory) changes in operating speed of one of the aircraft engines until the sensed vibration level substantially reaches a target vibration level. The momentary changes in operating speed of one of the aircraft engines can be commanded without regard to (i.e., irrespective of) phase information associated with imbalances of the two or more aircraft engines.

In some embodiments, the systems and methods disclosed herein can be used in conjunction with the teachings of U.S. Patent Publication No. US20180050809A1 entitled SYNCHRONIZATION OF AIRCRAFT ENGINES, which is incorporated herein by reference.

Aspects of various embodiments are described below through reference to the drawings.

Figure 1:
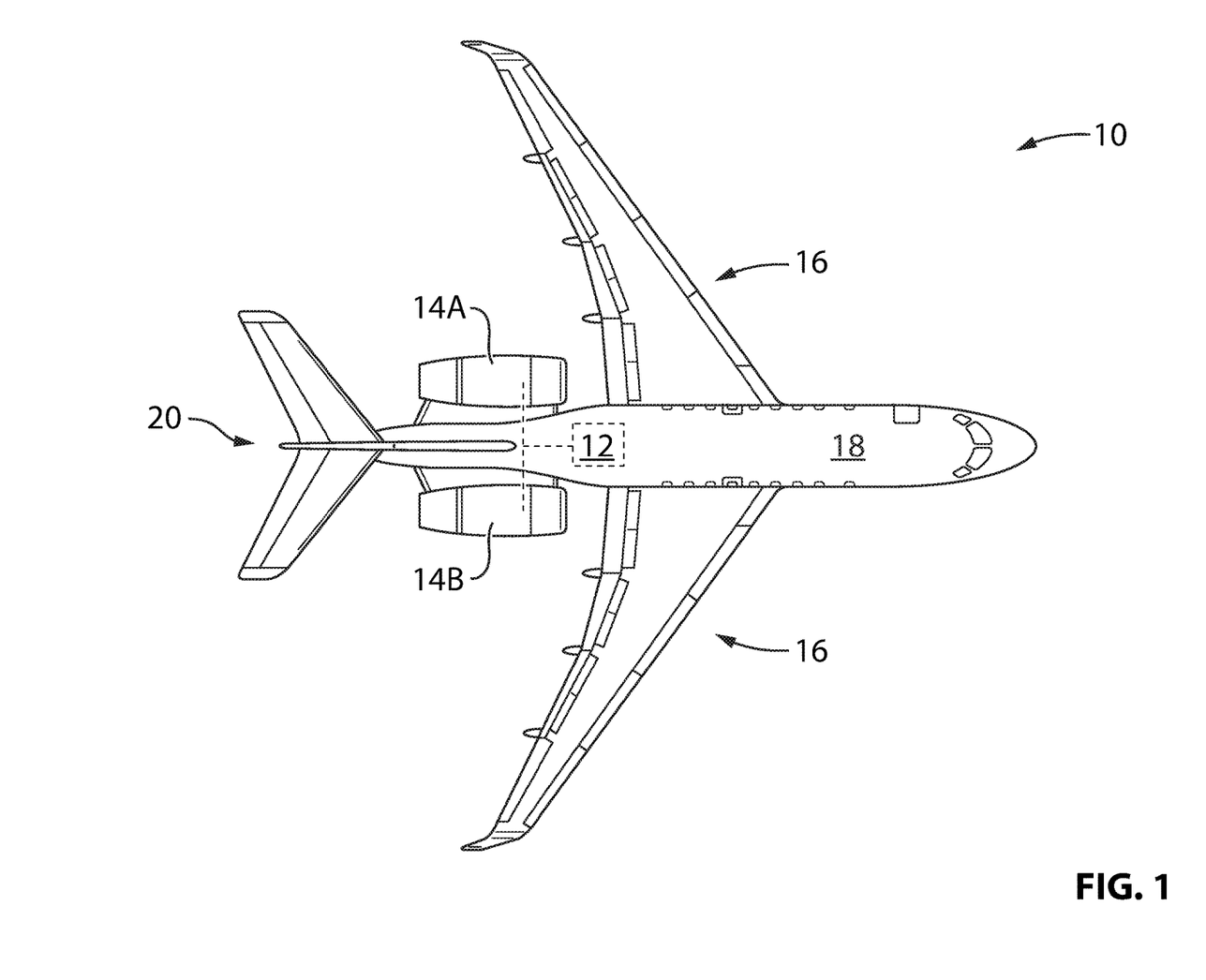
FIG. 1 is a top plan view of an exemplary aircraft comprising a system for synchrophasing two or more engines mounted thereto.

FIG. 1 is a top plan view of an exemplary aircraft 10 which can comprise system 12 (shown schematically) for synchrophasing two or more engines 14 mounted to aircraft 10. Aircraft 10 can be any type of aircraft such as corporate, private, commercial and passenger aircraft suitable for civil aviation. For example, aircraft 10 can be a narrow-body, twin-engine jet airliner. Aircraft 10 can be a fixed-wing aircraft or a rotary-wing aircraft comprising two or more engines 14A, 14B (also referred generally herein as "engines 14"). Aircraft 10 can also comprise one or more wings 16, fuselage 18 and empennage 20. One or more of engines 14 can be mounted to fuselage 18. Alternatively, or in addition, one or more of engines 14 can be mounted to wings 16. Aircraft 10 can comprise a passenger cabin inside of fuselage 18.

Engine 14 can play a significant role in affecting the comfort of passengers onboard of aircraft 10 when it comes to noise and structural vibration. Due to the powerful rotary elements of engines 14, namely the fan and the core, tonal noise and vibration can be produced at different respective frequencies. There can also be other tones that can originate from (e.g., hydraulic) pumps and/or other engine-driven equipment which can be related to and scale with the operation of aircraft engine(s) 14. Such excitation can get transmitted to the cabin by a combination of structural and airborne paths. Since aircraft 10 has multiple engines 14, multiple tones can be produced. Slight differences in the rotational speeds of the same elements in multiple engines 14 can give rise to various acoustic phenomena that can directly impact passenger comfort. For example difference in rotational speed between engines 14 can, in some situations, cause audible noise beats (amplitude modulations) inside of the cabin of aircraft 10. Such noise beats could be unpleasant for aircraft passengers.

Figure 2:
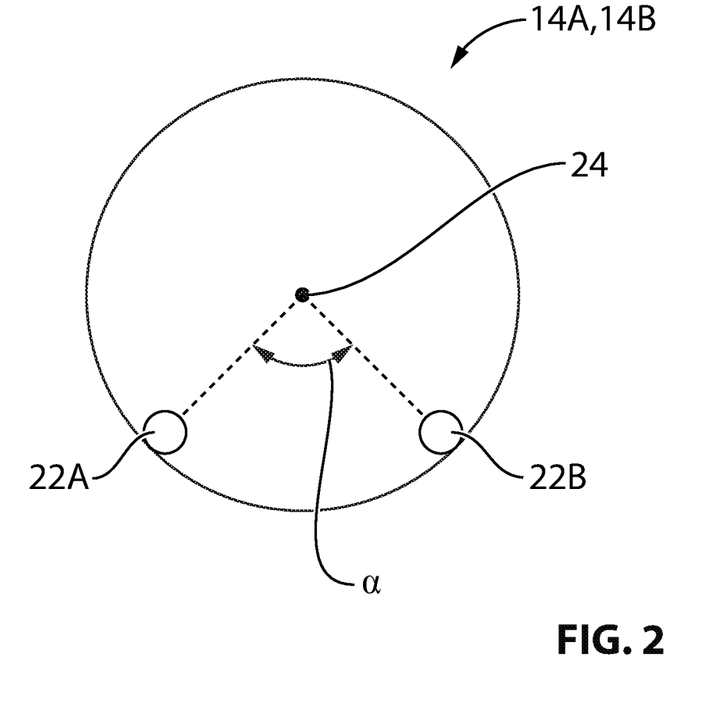
FIG. 2 is a schematic end-on view of two engines of the aircraft of FIG. 1 superimposed together and showing a phase angle between the two aircraft engines.

FIG. 2 is a schematic end-on view of both engines 14A, 14B of aircraft 10. Even in cases where the engines 14 operate at substantially the same operating (e.g., rotational) speed, some reduction in vibration can still be achieved by achieving a desired phase angle α between imbalances 22A and 22B of the first and second aircraft engines 14A, 14B respectively. This concept is referred to as "synchrophasing" engines 14A and 14B. Imbalance 22A is associated with engine 14A and is illustrated as an equivalent mass disposed at a first angular position relative to central axis 24 of engine 14A. Imbalance 22B is associated with engine 14B and is illustrated as an equivalent mass disposed at a second angular position relative to central axis 24 of engine 14B. Varying phase angle α between imbalances 22A and 22B of two engines 14 on a same aircraft 10 changes a resultant structural vibration level and/or a resultant noise level inside the cabin of aircraft 10. For example, in some situations, the timing of an excitation caused by one engine 14 can be adjusted to partially attenuate an excitation caused by another engine 14 to reduce an overall (e.g., summation) vibration level.

Figure 3:
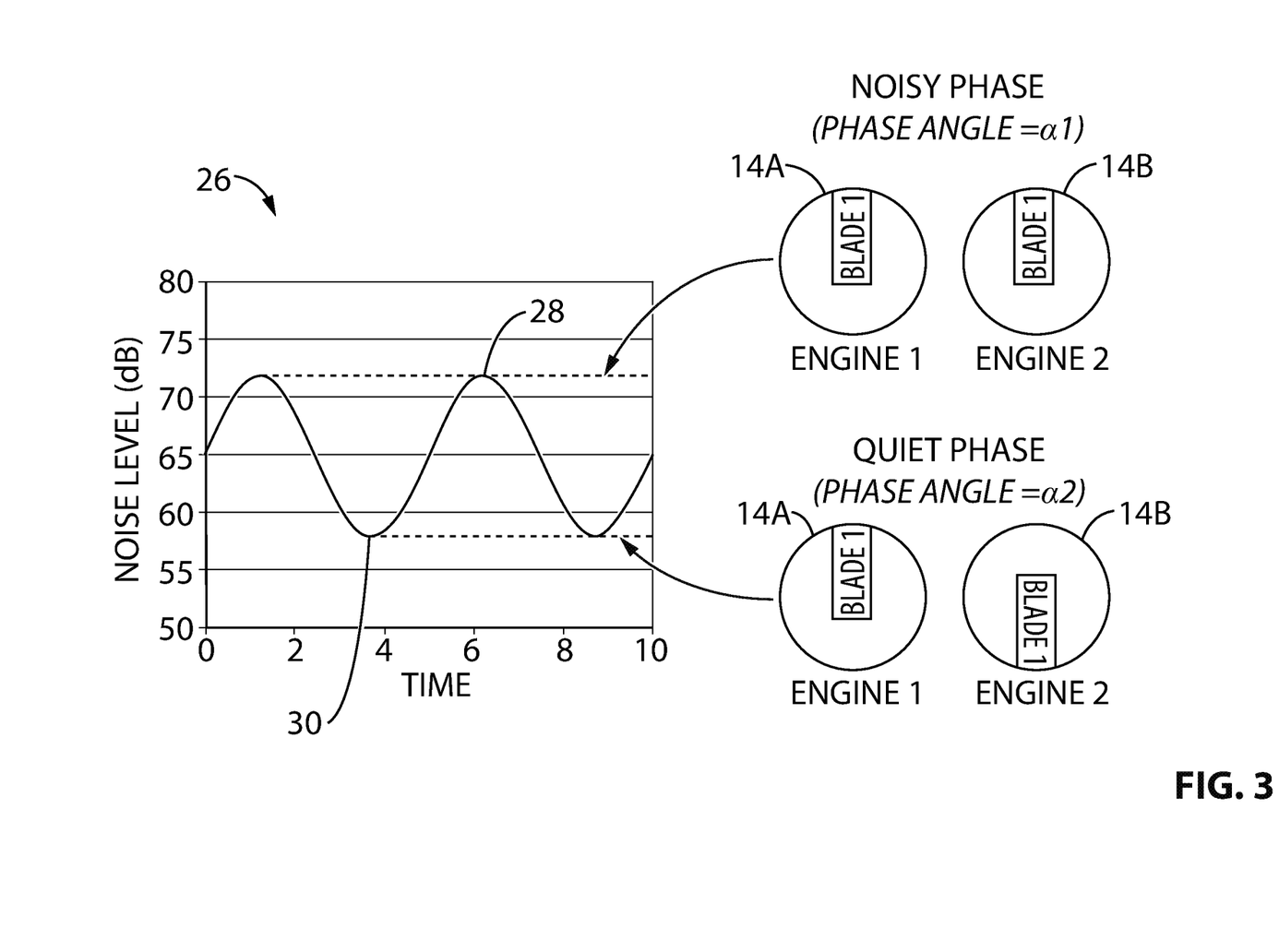
FIG. 3 illustrates an exemplary noise plot showing the effects of phase angle adjustment between two aircraft engines on noise level.

FIG. 3 illustrates an exemplary acoustic noise plot 26 showing the effects of phase angle α adjustment between aircraft engines 14A and 14B. Noise plot 26 can be representative of a resultant noise level sensed inside a passenger cabin of aircraft 10 over time using a microphone for example. Plot 26 shows a sinusoidal curve that oscillates between a high noise level 28 and a low noise level 30 as the phase angle α between the two engines 14A, 14B is varied. The oscillations in plot 26 can represent audible noise beats. For example, the high noise level 28 can correspond to a first phase angle α1 and the low noise level 30 can correspond to a second phase angle α2. As an example for a noisy phase, first phase angle α1 is illustrated as having a value of zero where representative blades of both engines 14A, 14B are both oriented vertically. As an example for a quiet phase, first phase angle α1 is illustrated as having a value of 180° where representative blades of both engines 14A, 14B are opposite to each other. For the sake of improving passenger comfort, it can be desirable to try to maintain the second phase angle α2 during operation of engines 14A, 14B in order to minimize or reduce the noise inside the cabin. However, identifying and maintaining a desired phase angle α for engines 14 that have a relatively high operating speed can be challenging. For example, typical rotational speeds of spools of turbofan engines can be between 10,000 and 23,000 revolutions-per-minute (RPM). The systems and methods disclosed herein can help with maintaining a phase angle α corresponding to a lowest noise or vibration level based on vibration (e.g., structural vibration, noise) feedback without requiring knowledge of the actual phase angle α.

Figure 4:
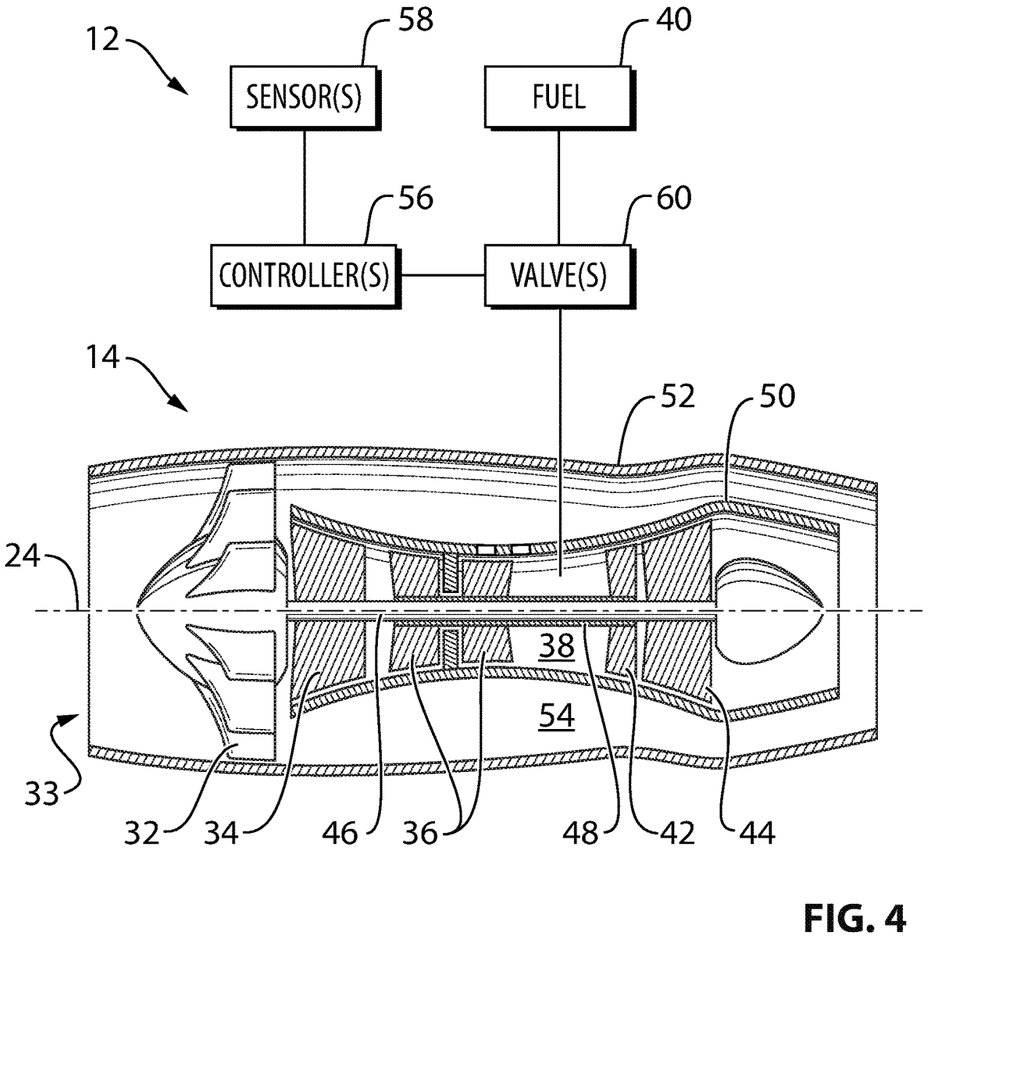
FIG. 4 is a schematic representation of an exemplary system for synchrophasing two or more aircraft engines and a schematic axial cross-sectional view of an exemplary engine of the aircraft of FIG. 1.

FIG. 4 is a schematic illustration of an exemplary system 12 for synchrophasing two or more engines 14 and a schematic axial cross-sectional view of an exemplary aircraft engine 14 of aircraft 10. System 12 is illustrated as being operatively coupled to one engine 14 but it is understood that system 12 could be similarly coupled to two or more engines 14. Both engines 14 of aircraft 10 can be substantially identical. For example, each engine 14 can be a turbofan gas turbine engine but it is understood that aspects of this disclosure are applicable to other types of aircraft engines 14 (e.g., turboprop). The specific configuration of engine 14 illustrated in FIG. 2 is shown for example only and is not intended to be limiting. For example, engine 14 can be a dual-spool gas turbine engine.

Engine 14 can comprise fan 32 through which ambient air received via inlet 33 is propelled, low-pressure compressor 34 and high-pressure compressor 36 for pressurizing the air, combustor 38 in which the compressed air is mixed with fuel 40 and ignited for generating a stream of hot combustion gases, high-pressure turbine section 42 and low-pressure turbine section 44 for extracting energy from the combustion gases. Fan 32, low-pressure compressor 34 and low-pressure turbine section 44 can be mechanically coupled together for common rotation via low-pressure shaft 46 and can cooperatively define a low-pressure spool of engine 14. High-pressure compressor 36 and high-pressure turbine section 42 can be mechanically coupled together for common rotation via high-pressure shaft 48 and can cooperatively define a high-pressure spool of engine 14. Low-pressure shaft 46 and high-pressure shaft 48 can be independently rotatably supported so that the low-pressure spool and the high-pressure spool can rotate separately from each other at different rotational speeds and/or in different directions. The portion of engine 14 in which low-pressure shaft 46 and high-pressure shaft 48 are housed may also be referred to as the "core" of engine 14 and may be delimited by inner casing 50. The annular passage surrounding inner casing 50 being delimited by outer casing 52 may also be referred to as bypass duct 54. System 12 and methods disclosed herein are based on vibration feedback without knowledge of phase angle information but their use can consequently result in synchrophasing of respective low-pressure spools and/or of respective high-pressure spools of engines 14A and 14B.

System 12 can comprise one or more controllers 56 (referred hereinafter in the singular) and one or more sensors 58 (referred hereinafter in the singular) for acquiring data indicative of a sensed vibration (e.g., structural vibration, noise) level associated with aircraft engines 14A, 14B. In various embodiments, sensor 58 can be a structural vibration sensor (e.g., accelerometer) or an acoustic sensor (e.g., microphone). In embodiments where multiple sensors 58 are used, such sensors 58 can comprise one or more structural vibration sensors and/or one or more acoustic sensors. In some embodiments, sensor 58 can be configured to sense a resultant vibration level (i.e., summation of vibration levels) caused by the operation of both engines 14A, 14B. Alternatively, one or more sensors 58 can be associate with each engine 14A, 14B respectively and a resultant (i.e., summation) vibration level can be determined by combining signals from the plurality of sensors 58.

Controller 56 can be configured to control an operating speed of one or both engines 14 by controlling fuel flow to combustor 38 by the actuation of one or more valves 60 (referred hereinafter in the singular) for example. Controller 56 can have both speed control functionality and phase control functionality. In some embodiments, speed control of engines 14 and phase control of engines 14 can be implemented via different controllers 56. In some embodiments, speed control can serve to keep engines 14A, 14B operating at a substantially same operating speed. Such speed control can be carried out by controller 56 using suitable proportional, integral and derivative (PID) control method using feedback from one or more suitable tachometers (not shown) associated with each engine 14 for example. As explained below, phase control can serve to change the phase angle α between engines 14 as a function of a sensed vibration level and without knowledge of a phase angle α between engines 14. For example, such phase control functionality can command momentary changes in operating speed of one or more engines 14 by controlling fuel flow to combustor via valve 60. Such phase control can be carried out by controller 56 using suitable integral (I) control method using feedback from sensor 58. The use of an I control method instead of a PID control method can allow the control authority of the phase control function to be at a slower/relaxed pace than the speed control function. This may be advantageous to permit a more authoritative control over the speed so that phase control may then be more effective.

In some embodiments, a momentary increase in operating speed of engine 14B for example can be achieved by momentarily increasing the fuel flow to combustor 38 by controlling valve 60 accordingly. After such momentary increase of operating speed of engine 14B, the operating speed of engine 14B can be commanded to return to the same operating speed as that of the other engine 14A by controlling the fuel flow to combustor 38 accordingly.

In some embodiments, the use of one or more increases in operating speed may be preferred but it is understood that a momentary decrease in operating speed may instead be used. For example, a momentary decrease in operating speed could be achieved by momentarily decreasing the fuel flow to combustor 38 by controlling valve 60 accordingly. After such momentary decrease in operating speed of engine 14B, the operating speed of engine 14B can be commanded to return to the same operating speed as that of the other engine 14A by controlling the fuel flow to combustor 38 accordingly. Commanding such momentary change in operating speed of one engine 14 based on feedback from sensor 58 can serve as changing phase angle α between engines 14A, 14B without requiring knowledge of the actual phase angle α.

Figure 5:
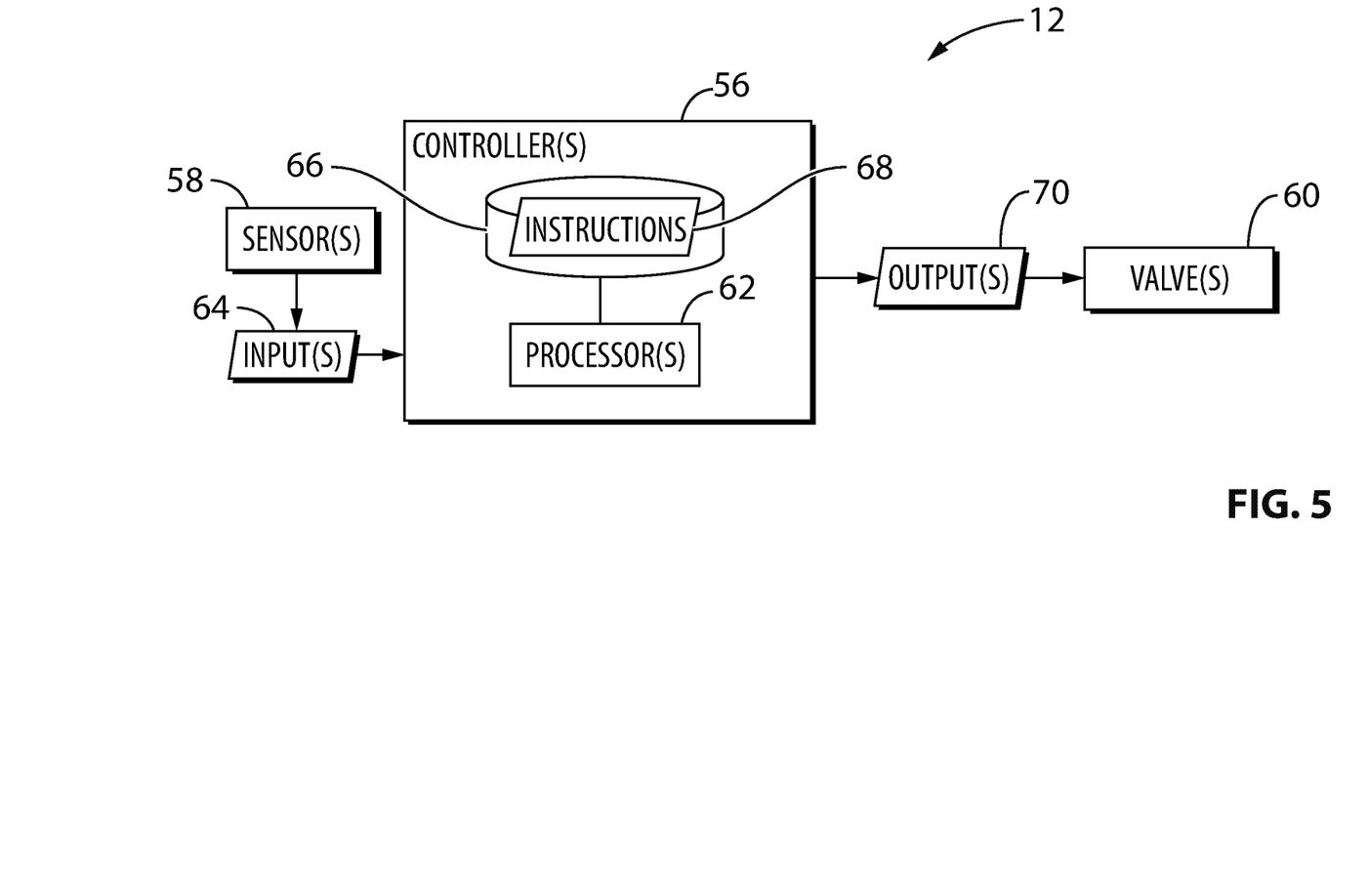
FIG. 5 is another schematic representation of the system for synchrophasing two or more engines of the aircraft of FIG. 1.

FIG. 5 is another schematic representation of system 12 for synchrophasing two or more engines 14 of aircraft 10. System 12 can comprise controller 56 and sensor 58 configured to detect a sensed resultant vibration (e.g., structural vibration, noise) level associated with aircraft engines 14. System 12 can comprise one or more data processors 62 (referred hereinafter in the singular) operationally coupled to receive input data 64 indicative of the sensed vibration level detected by sensor 58. System 12 can also comprise non-transitory storage medium 66 (i.e., memory) including machine-readable instructions 68 executable by processor 62 and configured to cause controller 56 to perform one or more steps so as to implement a computer-implemented process such that instructions 68, when executed by data processor 62 or other programmable apparatus, can cause the functions/acts specified in the methods described herein to be executed. Storage medium 66 can comprise any storage means (e.g. devices) suitable for retrievably storing machine-readable instructions 68 executable by data processor 62 of controller 56.

Various aspects of the present disclosure can be embodied as systems, devices, methods and/or computer program products. Accordingly, aspects of the present disclosure can take the form of an entirely hardware embodiment, an entirely software embodiment or an embodiment combining software and hardware aspects. Furthermore, aspects of the present disclosure can take the form of a computer program product embodied in one or more non-transitory computer readable medium(ia) 66 having computer readable program code embodied thereon. The computer program product can, for example, be executed by controller 56 to cause the execution of one or more methods disclosed herein in entirety or in part. It is understood that, based on the present disclosure, one skilled in the relevant arts could readily write computer program code for implementing the methods disclosed herein.

Controller 56 can be directly or indirectly operatively coupled to valve 60. For example, controller 56 may be considered part of the avionics of aircraft 10 instead of being part of one or more engines 14. Accordingly, controller 56 can be indirectly operatively coupled to valve 60 via an electronic engine controller (EEC) of engine. For example, output 70 (e.g., command signal) provided by controller 56 could be received by the EEC of engine 14 and then the EEC would control the operation of valve 60 accordingly. In other words, controller 56 can be operatively coupled for data communication with the EEC of one or more of engines 14 for providing instructions to and/or receiving feedback from the EEC(s). In some embodiments, controller 56 could instead be part of one of engines 14 and could perform additional functions than those described herein. In some embodiments, controller 56 or its functionality could be integrated into an EEC of one of engines 14 for example.

Figure 6:
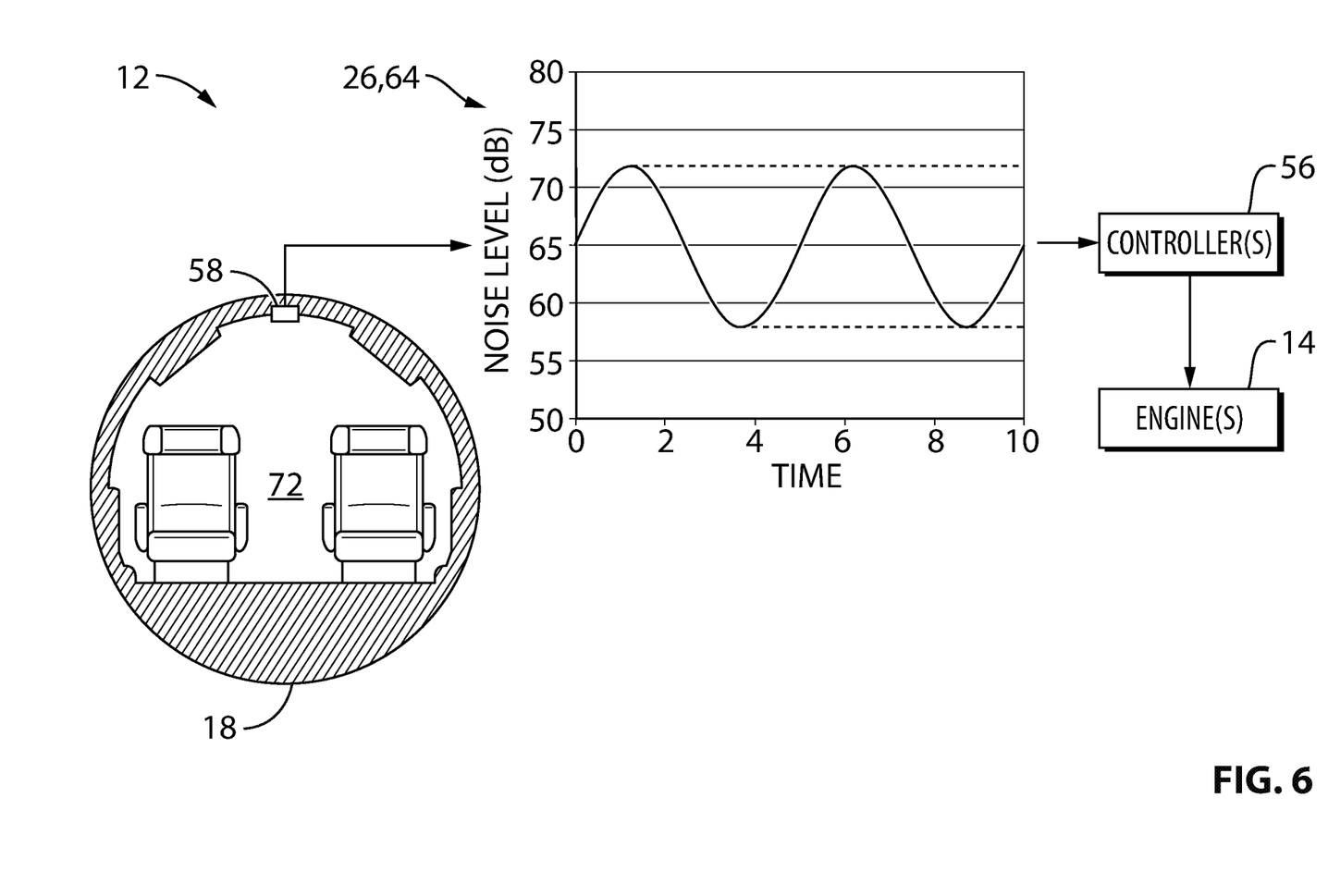
FIG. 6 is another schematic representation of the system for synchrophasing two or more engines of the aircraft of FIG. 1 including an acoustic sensor for sensing a noise level inside a cabin of the aircraft.

FIG. 6 is another schematic representation of system 12 for synchrophasing engines 14 of aircraft 10 including an acoustic sensor 58 for sensing a noise level inside cabin 72 of aircraft 10. FIG. 6 shows a transverse cross-sectional view of cabin 72 of aircraft 10. Sensor 58 can be a microphone disposed inside of cabin 72. Sensor 58 can provide input 64 (e.g., acoustic feedback) to controller 56 for use by controller 56 to command momentary operating speed changes of one or more engines 14 accordingly. Input 64 can be representative of noise plot 26 shown in FIG. 3. It is understood that sensor 58 can be disposed at a location other than inside cabin 72 of aircraft 10. It is also understood that suitable filtering or other signal conditioning can be performed on input 64 to extract relevant information from input 64. In various embodiments, such signal conditioning can be performed by controller 56 or other device(s).

Figure 7:
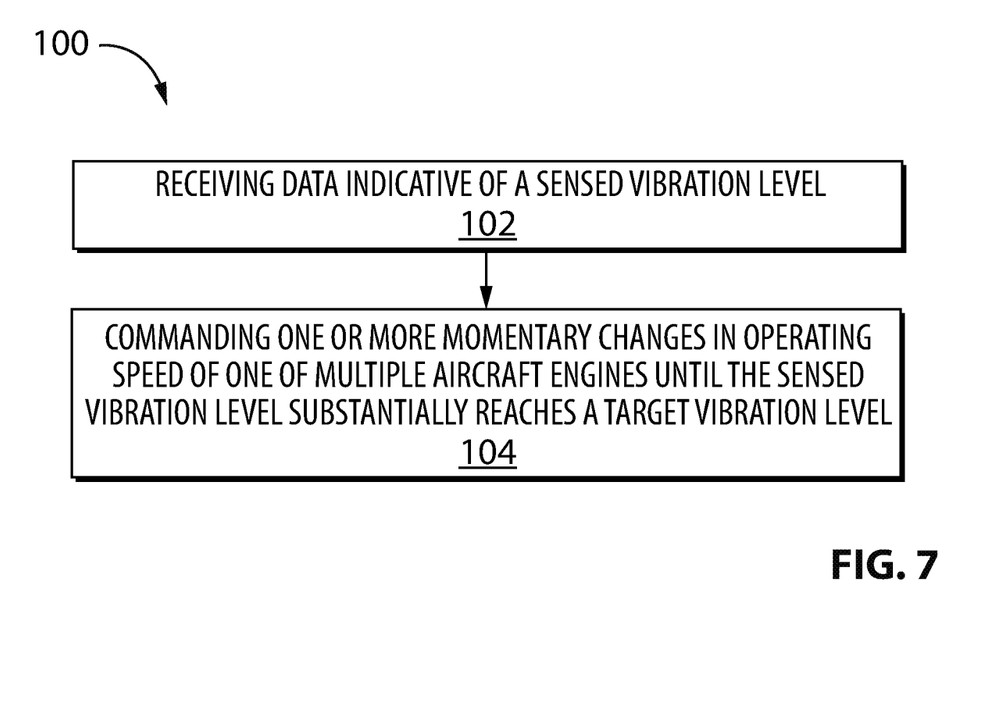
FIG. 7 is a flow chart illustrating an exemplary method for synchrophasing two engines of the aircraft of FIG. 1.

FIG. 7 is a flow chart illustrating an exemplary method 100 for synchrophasing two engines 14 of aircraft 10. Method 100 can be performed using system 12 described above or using other systems. For example, machine-readable instructions 68 can be configured to cause controller 56 to perform at least part of method 100. It is understood that aspects of method 100 can be combined with aspects of other methods described herein. In various embodiments, method 100 can comprise:

receiving data indicative of a sensed (e.g., resultant) vibration level 26, 64 (see FIGS. 5 and 6) associated with first aircraft engine 14A and second aircraft engine 14B operating at a substantially same operating speed (see block 102); and commanding one or more momentary changes in operating speed of second aircraft engine 14B until the sensed vibration level 26, 64 substantially reaches a target vibration level (see block 104).

The momentary changes in operating speed of second aircraft engine 14B can be commanded irrespective (i.e., without regard to, without knowledge of) phase angle information associated with imbalances 22A, 22B (see FIG. 2) of first and second aircraft engines 14A and 14B.

Each of the one or more momentary changes in operating speed of second aircraft engine 14B can be a respective one or more momentary increases in rotational speed of second aircraft engine 14B. The one or more momentary changes in operating speed of second aircraft engine 14B can be commanded while first aircraft engine 14A substantially maintains the same (i.e., constant) operating speed. For example, first aircraft engine 14A can serve as a master engine that substantially maintains its operating speed during method 100 and second aircraft engine 14B can serve as a servant engine that is subjected to the momentary changes in operating speed. It is understood that the master engine does not necessarily have to maintain a constant speed and it is possible to achieve synchrophasing even if the operating speed of the master engine is drifting due to auto-throttle action for example.

The sensed vibration level can comprise a resultant (e.g. summation) of vibrations from first aircraft engine 14A and second aircraft engine 14B and can be acquired via a single sensor 58 or by combining sensed signals from multiple sensors 58. The target vibration level can be determined based on a sensed vibration level minimum (e.g., low noise level 30 in noise plot 26 of FIG. 3) associated with first and second aircraft engines 14A, 14B. Accordingly, the target vibration level can be based on actual vibration feedback associated with aircraft engines 14A, 14B and based on a minimum noise level associated with the specific aircraft engines 14A, 14B operating at the current operating conditions. In various embodiments, the target vibration level can correspond to low noise level 30 of noise plot 26 or can be a value that is derived from low noise level 30. In some embodiments, a suitable target vibration level can correspond to or be selected based on a lowest root-mean-square (RMS) vibration amplitude in real-time so that the engines 14 can then be controlled to substantially achieve this lowest RMS vibration amplitude. In other words, system 12 can be used to identify a suitable target vibration level based on measurements from sensor 58 and then configure engines 14 to that target vibration level.

In some embodiments, the target vibration level can be determined via a scope function of controller 56 that is explained in more detail below. For example, the target vibration level can be determined by commanding an operating speed difference between the first and second aircraft engines 14A, 14B to intentionally induce beats of a predefined beat period in resultant vibration levels (e.g., noise plot 26) associated with first and second aircraft engines 14A, 14B; and then determining the target vibration level from the resultant vibration levels. It is understood that an initial or default value of the target vibration level may be stored in or used by controller 56 either for part of method 100 or throughout method 100. In various embodiments, the target vibration level can be determined in real-time (i.e., on-the-fly) in an adaptive manner based on sensed vibration levels, or, the target vibration level can be a predetermined target vibration level that is expected to be applicable to aircraft engines 14A, 14B. In various embodiments, the target vibration level can, once determined, remain constant throughout method 100, or, could change throughout method 100 based on operating conditions or time for example. The target vibration level may correspond to a specific target value or may correspond to a range of target values corresponding to a range of acceptable (i.e., quiet) phase angles.

Figure 8:
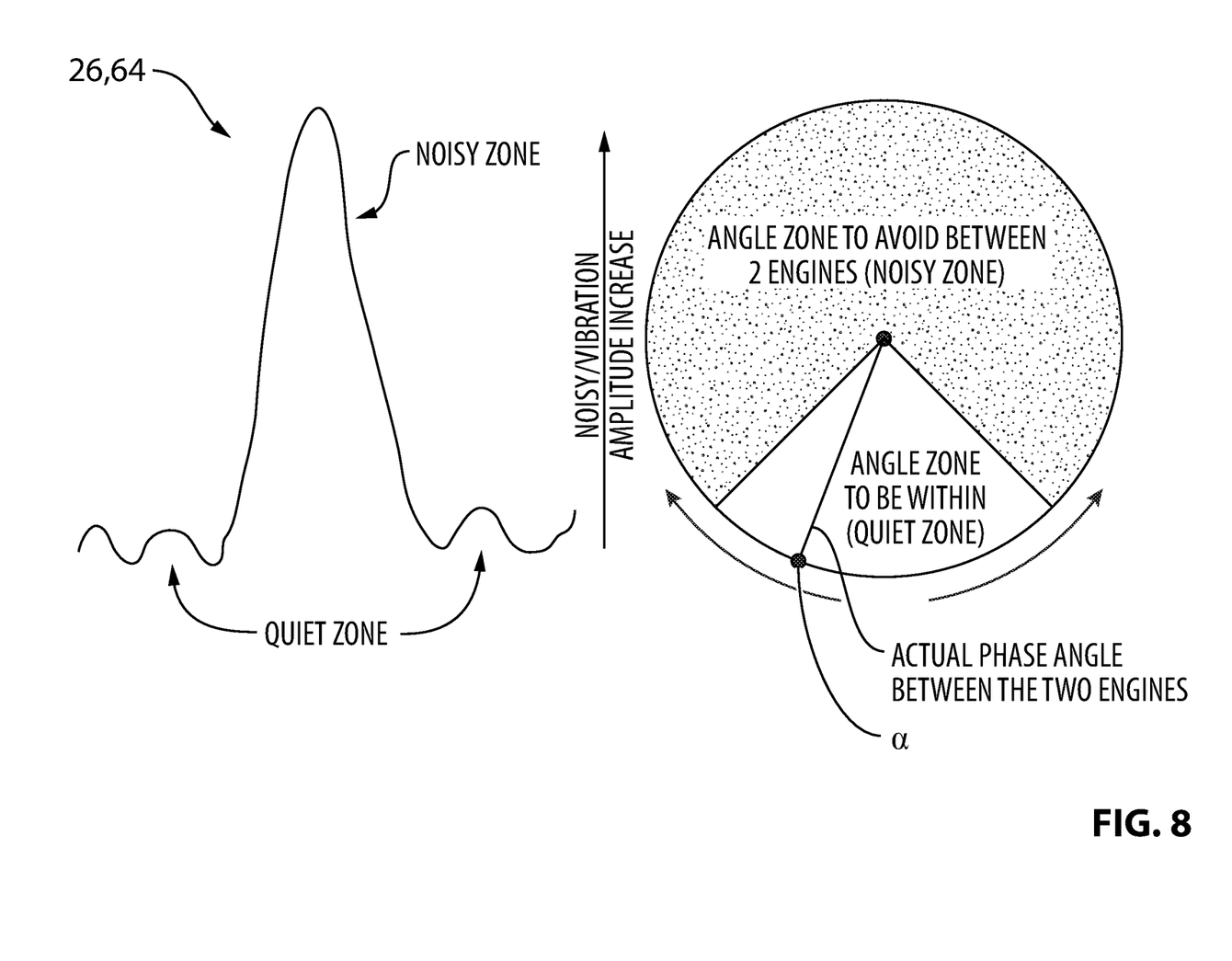
FIG. 8 is a diagram graphically illustrating the synchrophasing of the two engines of the aircraft of FIG. 1.

FIG. 8 is a diagram graphically illustrating the synchrophasing of first and second engines 14A, 14B of aircraft 10. FIG. 8 shows an exemplary resultant noise plot 26 with a corresponding graphical representation (pie graph) of phase angles α between first and second engines 14A, 14B. The pie graph shows a noisy range of phase angles in a noisy zone that correspond to a noisy region of noise plot 26 and a quiet range of phase angles in a more quiet zone that correspond to a quiet region of noise plot 26. The pie graph also shows a position of an exemplary current phase angle α between first and second engines 14A and 14B that is within the quiet zone. Even though the pie chart of FIG. 8 shows noisy and quiet zones in terms of phase angle α for the purpose of explanation, it is understood that the methods and systems described herein can cause changes in phase angle α without knowledge of the actual phase angle α so that the actual phase angle α does not have to be sensed or determined.

The momentary changes in operating speeds in method 100 can be momentary increases and/or decreases in operating speed as explained above however, momentary increases in operating speed (i.e., speed bursts) can be preferred in some embodiments to avoid reversing the inertia of a spool of aircraft engine 14B. In some embodiments, the momentary changes in operating speed can all be of the same type (i.e., in the same direction) so that the momentary changes are all increases in operating speed or all decreases in operating speed. In a typical optimization problem, if the wrong direction is continuously chosen, the solution can go away from the optimal value indefinitely. However, due to the cyclical nature of the solution in arriving at the target vibration level within the quiet zone, whether aircraft engine 14B is sped up or slowed down, it will eventually arrive at the solution even if not in the shortest path. Although one direction can get to the solution faster because it is closer to the target vibration level, the other direction can also get to the solution within a reasonable amount of time. Accordingly, method 100 does not require knowledge of whether second aircraft engine 14B (i.e., the servant engine) is leading or lagging a target phase angle solution.

Even though the momentary changes in operating speed may all be of the same type, the magnitude of the momentary changes can vary in some embodiments. For example a magnitude of the momentary changes in operating speed (e.g., speed burst) can be selected based on (e.g., proportional to) a magnitude of a difference between a current vibration level and the target vibration (e.g., noise) level. In some embodiments, the ability to select momentary changes in operating speed of different magnitudes could potentially reduce the time required to reach the target vibration level. For example, a larger or longer-lasting momentary change in operating speed can be commanded for larger differences between the sensed vibration level and the target vibration level.

Figure 9:
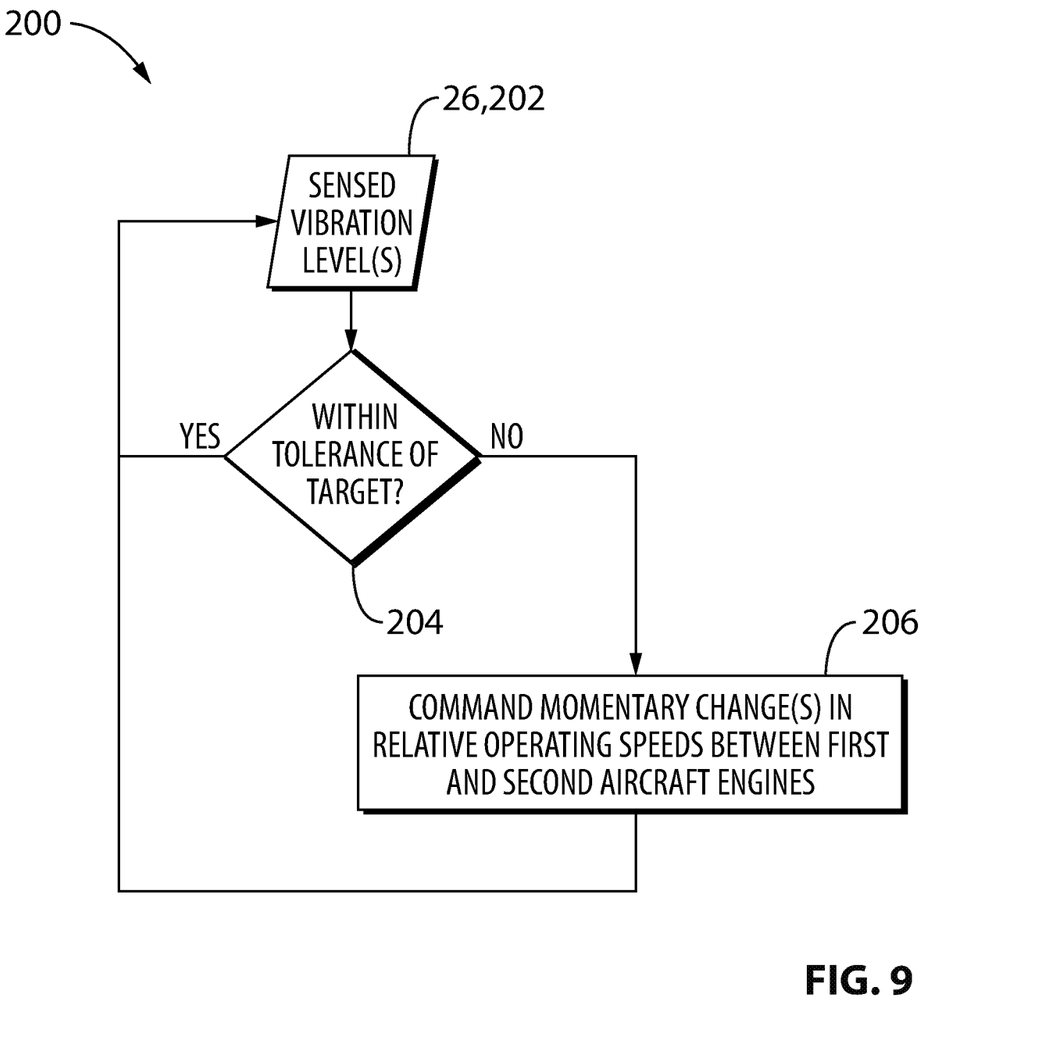
FIG. 9 is a flow chart illustrating another exemplary method for synchrophasing two engines of the aircraft of FIG. 1.

FIG. 9 is a flow chart illustrating an exemplary method 200 for synchrophasing two engines 14 of aircraft 10. Method 200 can be performed using system 12 described above or using other systems. For example, machine-readable instructions 68 can be configured to cause controller 56 to perform at least part of method 200. It is understood that aspects of method 200 can be combined with aspects of other methods described herein. Accordingly, aspects of method 100 described above are also applicable to method 200. In various embodiments, method 200 can comprise:

receiving data indicative of a first sensed vibration level 26, 64 (see FIGS. 5 and 6) associated with first aircraft engine 14A and second aircraft engine 14B operating at a substantially same operating speed (see block 202);

if the first sensed vibration level 26, 64 is not within (e.g., is higher than) an acceptable tolerance of the target vibration level (see block 204), then commanding one or more first momentary change(s) in relative operating speeds between first and second aircraft engines 14A, 14B (see block 206). Such momentary change(s) in relative operating speeds can include an increase in operating speed of second aircraft engine 14B while the operating speed of first aircraft engine 14A remains substantially constant.

If the first sensed vibration level 26, 64 is within the acceptable tolerance of the target vibration level (see block 204), then no momentary change(s) in relative operating speeds between first and second aircraft engines 14A, 14B may be required and method 200 can return to block 202 for continued monitoring of the vibration level in a closed feedback loop manner.

After the commanded one or more first momentary changes (e.g., increases) in operating speed of second aircraft engine 14B, method 200 can return to block 202 and comprise receiving data indicative of a second sensed vibration level 26 associated with first aircraft engine 14A and the second aircraft engine 14B operating at substantially the same operating speed (see block 204) and method 200 can cycle through blocks 202, 204 and 206 in a closed loop manner.

The target vibration level can be determined based on a sensed vibration level minimum (e.g., low noise level 30 in noise plot 26 of FIG. 3) associated with first and second aircraft engines 14A, 14B.

A magnitude of the first and/or second momentary changes (e.g., increases) in operating speed (e.g., speed bursts) can be selected based on (e.g., proportional to) a magnitude of a difference between the corresponding first and/or second sensed vibration levels and the target vibration level.

First aircraft engine 14A can serve as a master engine that substantially maintains its operating speed during method 200 and second aircraft engine 14B can serve as a servant engine that is subjected to the momentary increases in operating speed.

It is understood that the systems and methods described herein can be used to synchrophase more than two engines 14 together. For example, one of multiple engines 14 could serve as the master engine which maintains its operating speed while the other engines 14 are operated as servant engines that are subjected to momentary changes in operating speeds in order to synchrophase with the master engine 14. In some embodiments, methods 100 and/or 200 could be used to sequentially synchrophase different pairs of engines 14 within the plurality of engines 14 mounted to aircraft 10.

Figure 10:
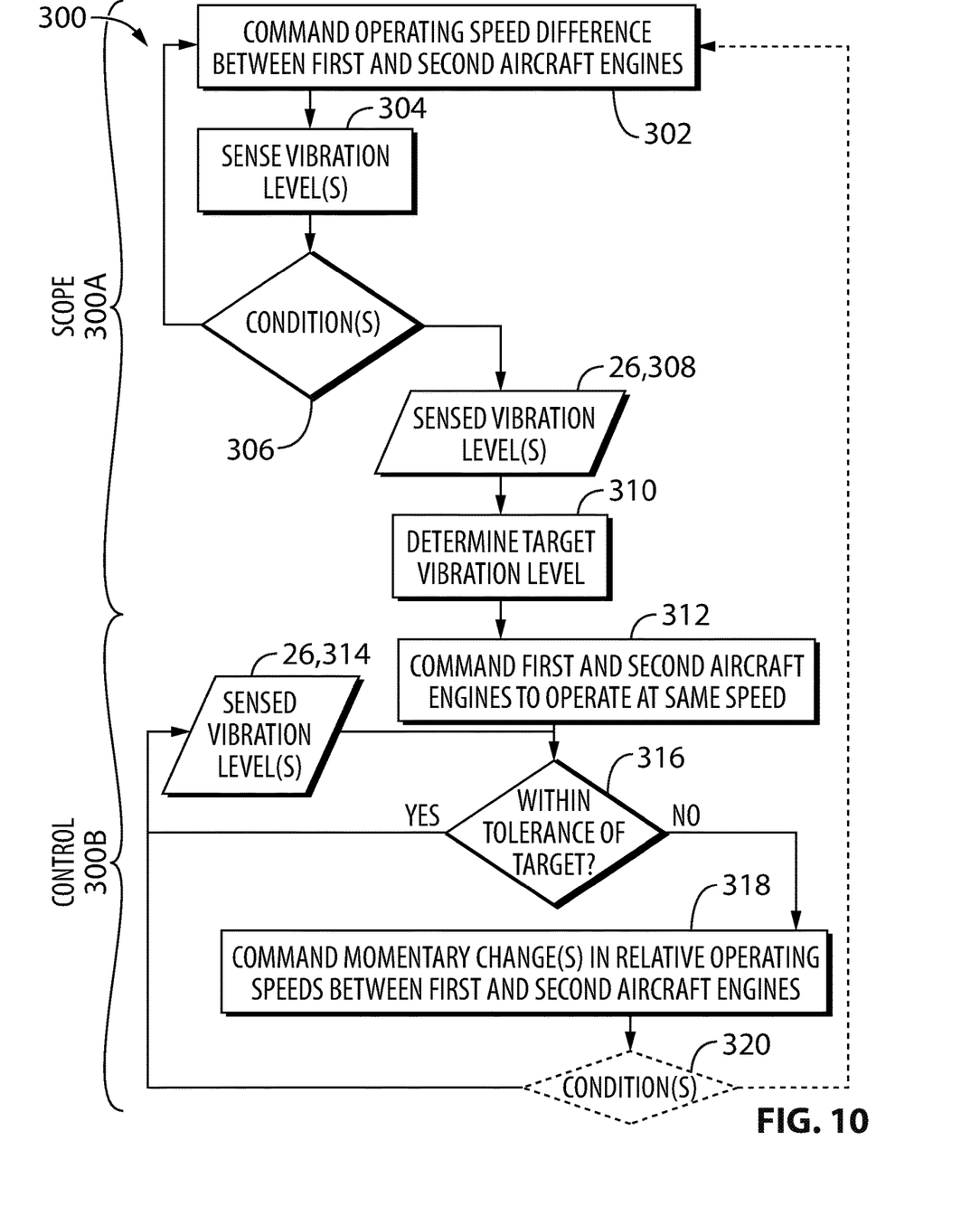
FIG. 10 is a flow chart illustrating a further exemplary method for synchrophasing two engines of the aircraft of FIG. 1.

FIG. 10 is a flow chart illustrating a further exemplary method 300 for synchrophasing two engines 14 of aircraft 10. Method 300 can be performed using system 12 described above or using other systems. For example, machine-readable instructions 68 can be configured to cause controller 56 to perform at least part of method 300. It is understood that aspects of method 300 can be combined with aspects of other methods described herein. Accordingly, aspects of methods 100 and 200 described above are also applicable to method 300.

The systems and methods described herein can be performed in real-time and in an adaptive manner during operation of aircraft 10 so that changes in operating conditions of aircraft 10 or of aircraft engines 14 can be taken into account and that synchrophasing and/or the target vibration level may be adjusted accordingly. Due to the dynamic nature of the relationship between relative phase angle α of a multi-engine system and the cabin noise level (or a structural vibration level), a phase angle α corresponding to the lowest noise level may not necessarily remain constant over time. Furthermore, the transfer function via which noise in cabin 72 is generated from the operation of engines 14 can also vary over time. Factors such as the operating conditions of aircraft 10, operating speed of engines 14, atmospheric conditions, altitude, airspeed, and wear of engine 14 can cause such phase angle α and/or the transfer function to cabin 72 to change over time and even throughout a single flight cycle. Regardless of whether the above or other factors cause a change in imbalances associated with engines 14 or a change in transfer path to cabin 72, the end result can be a change in the lowest noise level that can be achieved by synchrophasing of aircraft engines 14A, 14B. Accordingly, relying solely on changes in engine imbalances may not be sufficient to achieve the lowest noise level available in a specific situation.

The systems and methods described herein can accommodate such changes by updating the target vibration level in real-time during operation of aircraft engines 14 in an adaptive manner. For example, the systems and methods described herein can make use of a scope portion 300A of method 300 during which the target vibration level is determined dynamically at the current operating conditions and state of aircraft engines 14 and of aircraft 10. Once the applicable current target vibration level has been identified, the target vibration level can be used for synchrophasing aircraft engines 14 accordingly. The control portion 300B of method 300 can be substantially identical to method 200 in some embodiments of method 300.

Method 300 can comprise:

commanding an operating speed difference between first and second aircraft engines 14A, 14B to induce beats of a predefined first beat period in resultant vibration levels 26, 308 associated with first and second aircraft engines 14A, 14B (see block 302);

sensing resultant vibration levels 26 while first and second aircraft engines 14A, 14B are operating at the commanded first operating speed difference (see block 304);

determining a target vibration level from the sensed resultant vibration levels 26, 308 (see block 310); and commanding first and second aircraft engines 14A, 14B to operate at a substantially same operating speed (see block 312);

sensing resultant vibration levels 26, 314 associated with first and second aircraft engines 14A, 14B while first and second aircraft engines 14A, 14B are operating at the substantially same operating speed; and commanding one or more momentary changes in relative operating speeds between the first and second aircraft engines 14A, 14B so that resultant vibration levels 26, 314 substantially reach the target vibration level (see blocks 316, 318). The first momentary changes in relative operating speeds between the first and second aircraft engines 14A, 14B can be commanded irrespective of phase information associated with imbalances of first and second aircraft engines 14A, 14B. It is understood that, in the context of the present disclosure, substantially reaching the target vibration level is intended to encompass reaching a vibration level that is within an accepted tolerance from the target vibration level.

Condition at block 306 can comprise a criteria defining a time period for which the sensing of resultant vibration levels 26, 308 are sensed at block 304. During this time period, the operating speed difference between first and second aircraft engines 14A, 14B can be maintained for a duration of at least two times the predefined beat period before determining the target vibration level. The condition can be a timer that is based on (e.g., a multiple of) the predefined beat period. For example, if the predefined beat period is selected to be about 10 seconds, a suitable duration that is mandated by condition 306 may be 20 seconds or 30 seconds. The predefined beat period can be selected to be sufficiently long so as not to be disrupting or noticeable to passengers of aircraft 10 but yet still short enough to allow for at least two full beat cycles to be captured within a practical amount of time. A predefined beat period of 10 seconds can be induced by commanding a speed bias of 0.1 Hz between first and second aircraft engines 14A, 14B. The predefined beat period can be equal to or greater than 5 seconds in some embodiments and can be constant throughout the operation of method 300.

Accordingly, blocks 302, 304 and 306 of the scope portion 300A of method 300 can operate as a closed loop until condition 306 has been satisfied. During this time period, sensed resultant vibration levels 26, 308 can be stored in storage medium 66 (see FIG. 5) for subsequent use for determining the target vibration level at block 310. As explained above, the target vibration level can correspond to or be based on a lowest root-mean-square (RMS) amplitude determined from sensed resultant vibration levels 26, 308.

In reference to control portion 300B of method 300, if sensed resultant vibration level 26, 314 is not within (e.g., is higher than) the acceptable tolerance of the target vibration level (see block 316), then the one or more momentary change(s) in relative operating speeds between first and second aircraft engines 14A, 14B can be commanded (see block 318). However, if sensed resultant vibration level 26, 314 is within the acceptable tolerance of the target vibration level (see block 316), then no momentary change(s) in relative operating speeds between first and second aircraft engines 14A, 14B may be required and method 300 can return to block 314 for continued monitoring of the vibration level in a closed feedback loop manner.

Method 300 can also comprise optional condition(s) 320, which can cause method 300 to exit control portion 300B and revert to scope portion 300A. Such condition(s) 320 can be configured to detect the inability of control portion 300B to keep sensed resultant vibration level 26, 314 with an acceptable tolerance of the target vibration level due to a change in operating conditions of aircraft 10 or of aircraft engines 14. For example, condition(s) 320 can comprise a counter that counts a number of sequential momentary changes in relative operating speeds that have been commanded at block 318 without being able to reach the target vibration level.

In embodiments where control portion 300B of method 300 is governed by an integral controller, the inability of control portion 300B to reach the target vibration level can manifest itself by an error buildup in the integral controller. Accordingly, condition(s) 320 can comprise an error saturation threshold that triggers method 300 to revert to scope portion 300A in the event of an error saturation threshold is reached by the integral controller. Such inability of control portion 300B to reach the target vibration level can be due to a change in operating conditions of aircraft engines 14 or of aircraft 10 causing the target vibration level to be too low for the current operating conditions for example.

Instead or in addition, condition(s) 320 can be triggered by a change in phase of flight of aircraft 10 or other change(s) in operating conditions in order to cause method 300 to revert back to scoping portion 300B for the purpose of determining a new updated target vibration level applicable to the new operating conditions.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method for synchrophasing aircraft engines, the method comprising:

detecting, by one or more sensors, a sensed vibration level associated with a first aircraft engine and a second aircraft engine operating at a substantially same operating speed;

receiving, at a controller, data indicative of the sensed vibration level; and commanding, by the controller, one or more momentary changes in operating speed of the second aircraft engine until the sensed vibration level substantially reaches a target vibration level, the momentary changes in operating speed of the second aircraft engine being commanded irrespective of phase information associated with imbalances of the first and second aircraft engines, wherein a magnitude of at least one of the one or more momentary changes in operating speed is related to a magnitude of a difference between the sensed vibration level and the target vibration level.

2. The method as defined in claim 1, wherein each of the one or more momentary changes in operating speed of the second aircraft engine is a respective momentary increase in rotational speed of the second aircraft engine.

3. The method as defined in claim 1, wherein the sensed vibration level comprises a summation of vibrations from the first aircraft engine and the second aircraft engine.

4. The method as defined in claim 1, wherein the target vibration level is based on a sensed vibration level minimum associated with the first and second aircraft engines.

5. The method as defined in claim 1, comprising:
commanding an operating speed difference between the first and second aircraft engines to induce beats of a predefined period in resultant vibration levels associated with the first and second aircraft engines operating at different speeds; and
determining the target vibration level from the resultant vibration levels.

6. The method as defined in claim 1, comprising commanding the one or more momentary changes in operating speed of the second aircraft engine while the first aircraft engine substantially maintains the same operating speed.

7. The method as defined in claim 1, wherein the sensed vibration level is an acoustic noise level.

8. The method as defined in claim 1, wherein the sensed vibration level is an acoustic noise level inside a passenger cabin of an aircraft to which the first and second aircraft engines are mounted.

9. The method as defined in claim 1, wherein the first and second aircraft engines are turbofan gas turbine engines.

10. A system for synchrophasing aircraft engines, the system comprising:
one or more sensors configured to detect a sensed vibration level associated with a first aircraft engine and a second aircraft engine operating at a substantially same operating speed; and
one or more controllers operationally coupled to receive data indicative of the sensed vibration level detected by the one or more sensors, the one or more controllers being configured to command one or more momentary changes in operating speed of the second aircraft engine until the sensed vibration level substantially reaches a target vibration level, the momentary changes in operating speed of the second aircraft engine being commanded irrespective of phase information associated with imbalances of the first and second aircraft engines;
wherein a magnitude of at least one of the one or more momentary changes in operating speed is related to a magnitude of a difference between the sensed vibration level and the target vibration level.

11. The system as defined in claim 10, wherein each of the one or more momentary changes in operating speed of the second aircraft engine is a respective momentary increase in rotational speed of the second aircraft engine.

12. The system as defined in claim 10, wherein the sensed vibration level comprises a summation of vibrations from the first aircraft engine and the second aircraft engine.

13. The system as defined in claim 10, wherein the target vibration level is based on a sensed vibration level minimum associated with the first and second aircraft engines.

14. The system as defined in claim 13, wherein the one or more controllers are configured to determine the target vibration level based on a vibration level minimum in data indicative of a plurality of sensed vibration levels associated with the first and the second aircraft engines.

15. The system as defined in claim 10, wherein the one or more controllers are configured to command the one or more momentary changes in operating speed of the second aircraft engine while the first aircraft engine substantially maintains the same operating speed.

16. The system as defined in claim 10, wherein the one or more sensors include one or more microphones.

17. An aircraft comprising the system of claim 10.

18. The aircraft as defined in claim 17, wherein the first and second aircraft engines are turbofan gas turbine engines.

* * * * *